Figures 1, 2:
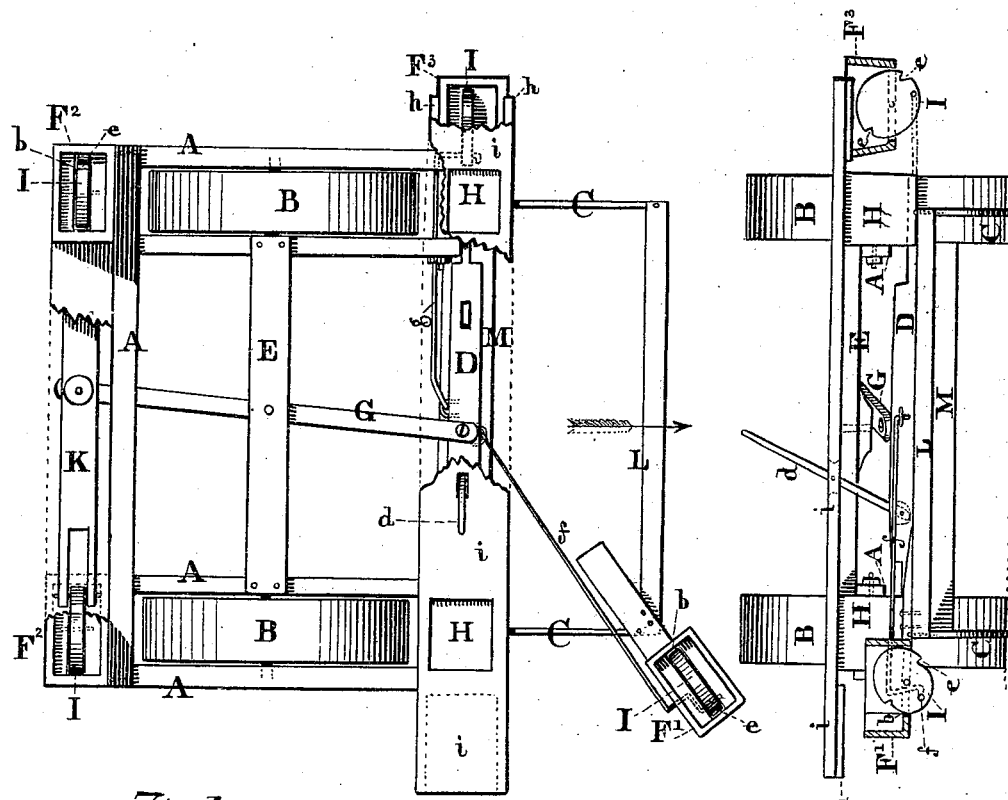

UNITED STATES PATENT OFFICE.

JOHN McGREGOR, OF PRINCEVILLE, ILLINOIS.

IMPROVEMENT IN CORN-MARKERS.

Specification forming part of Letters Patent No. 170,287, dated November 23, 1875; application filed July 17, 1875.

*To all whom it may concern:*

Be it known that I, JOHN McGREGOR, of Princeville, in the county of Peoria, in the State of Illinois, have invented an Improvement in Check-Row Attachments to Corn-Planting Machines, or to Seed-Planters; and do hereby declare that the following is a full, clear, and exact description thereof, reference being had to the annexed drawings, making a part of this specification, in which like letters of reference refer to like parts, and in which—

Figure 1 represents a plan view; Fig. 2, a front elevation, seen from before the "runners."

This improvement in powder-marking attachments to corn-planters, consists in one or more boxes provided with a vertical oscillating disk or wheel, provided with two notches or recesses on either side, and used alternately to throw the marking-powder forcibly and vertically to the ground, as, first, at proper planting distance ahead of the corn-planting machine or seed-box, or its planting-place; second, at the same distance in the rear of the last deposit of seed, by the cut-off bar or dropping device; third, between the rows of corn in process of planting and the next to be planted; fourth, or either of these positions alone, or all simultaneously, in addition to which process the rear powder-box may be enlarged to deposit lime or other fertilizer upon the last-dropped seed fallen from the seed-boxes in advance of it.

This mark, or little deposit of white dust, is thrown out at each motion of the dropper-bar of the planter, and deposited at the same moment as the seed or corn, (either in advance of each planting or elsewhere,) by a vertical wheel set in a slot in the bottom of each powder-box, which wheel, having a notch on its circumference, carries out some of said powder, and throws it downward in a compact mass at each motion of the connected dropper-bar of the planter, so that the wind cannot scatter it before reaching the soil.

In place of a vertical wheel, I also employ a horizontal wheel with a hole or recess to carry out the powder, or a similar substance, to the dropping-valve of the corn or seed planter, &c., or by any means which will forcibly expel the powder in a direct line to the soil.

In the drawings, A represents the frame of the corn-planter; B, the wheels; C C, the runners; D, the dropper-bar; $d$, its lever; E, cross-bar, (over axles,) to which the connecting-lever G, attached in front to the dropper-bar C, and in the rear to the powder-box crank-rod K, is pivoted. $F^1 F^2 F^2$ represent the powder-boxes, or the different places in which they may be advantageously placed; but one alone will be, ordinarily, enough to mark the "planting," the rear boxes $F^2$ being used for depositing fertilizers, or for combined use of dropping a lime fertilizer, and as a mark over the last planting or dropping of seed. $F^1$ represents the most desirable position for dropping the powder from, as it will indicate the exact spot to let fall the next seed, being placed projecting in front of the runner C. This box, or rather its dropping-wheel I, is operated by a rod, $f$, attached to the sliding corn-dropper bar D. The box $F^3$ on the outside of the seed-box H indicates another position for dropping the powder from, so as to do this simultaneously with, and in the line of the last planting from, both seed-boxes. A box can be used on either or both sides for marking; but this can also be made detachable from the pin of the crank-rod $g$, and placed in the grooves $h$ under the extension $i$ of either seed-box H, on commencing another row. Each powder-box is provided with a cover, and with a disk or oval, or a wheel, I, pivoted vertically in a slot, $b$, in the bottom of the box, which wheel is provided on its circumference, at two opposite points, with a notch or hole, $e$, to receive a small quantity of powder and throw it with force, in a direct line, down to the soil, each time the same is moved by its connections with the corn-dropper bar D, by an oscillatory movement, by which one notch or hole is filling with powder while its fellow is discharging. G is the lever by which the rear boxes for powder or for fertilizers, $F^2$, are worked, and is pivoted in front to the dropper-bar D, and pivoted to the interconnecting rod or crank-rod K of said rear boxes $F^2$. H represents the seed-boxes; I, the disks or powder-throwing wheels; $e\ e$, two small recesses to receive powder; K, the oscillating bar, connecting the powder-throwing disks of the powder or fertilizer boxes F² F² by means of the pivoted lever G.

What I claim as my invention is—

The combination, with the corn-planter frame A, of the rear powder or fertilizing boxes F², disks I, connecting-bar K, connecting-lever G, attached to the corn-dropper bar D, substantially as described.

In testimony that I claim the foregoing check-row attachment to corn-planters, I have hereunto set my hand this 1st day of July, 1875.

JOHN McGREGOR.

Witnesses:
   CONSTANT ARDEN,
   JAMES M. MORSE.